Aug. 9, 1966     A. V. MOTSINGER     3,265,262
PLASTIC BAG FOR CARRYING WATER ON MOTOR VEHICLES
Filed Dec. 30, 1963
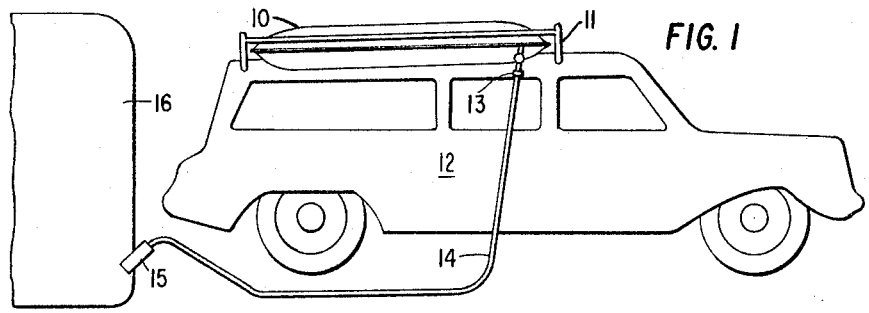
FIG. 1
FIG. 2a
FIG. 3    FIG. 3a
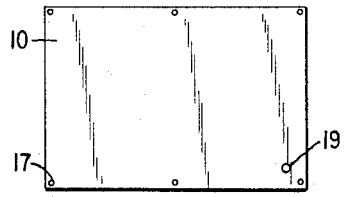
FIG. 2
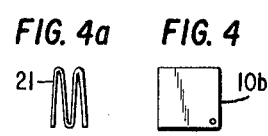
FIG. 4a    FIG. 4
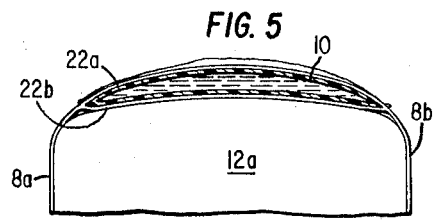
FIG. 5
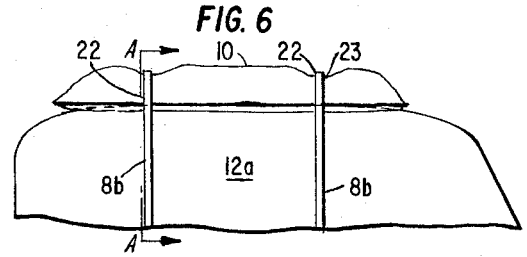
FIG. 6
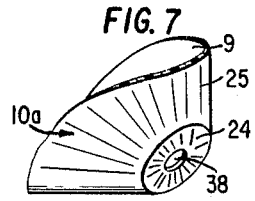
FIG. 7
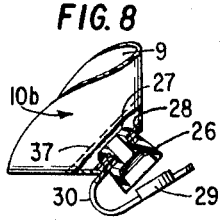
FIG. 8
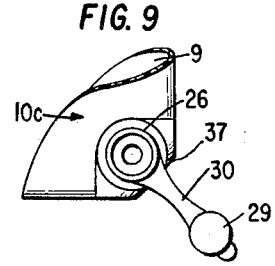
FIG. 9
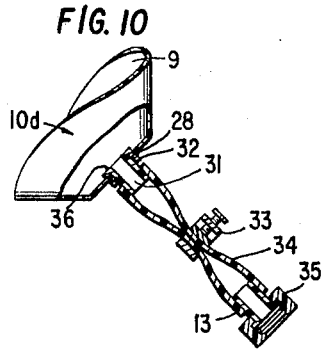
FIG. 10
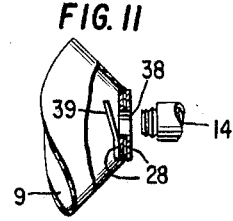
FIG. 11
INVENTOR
Armand V. Motsinger

United States Patent Office 3,265,262
Patented August 9, 1966

3,265,262
PLASTIC BAG FOR CARRYING WATER ON MOTOR VEHICLES
Armard Valery Motsinger, 485 Paradise Road, Aberdeen, Md.
Filed Dec. 30, 1963, Ser. No. 334,436
2 Claims. (Cl. 224—42.1)

This invention relates to a convenient means of carrying water on top of a motor vehicle by use of a thin plastic bag.

An object of this invention is to provide an inexpensive water bag that will lay snugly on any shape of vehicle top surface so that the weight of fluid will be evenly distributed over the surface, with little stress on the bag material.

Another object of this invention is to provide a thin wall envelope shaped bag that can be pressed flat, folded and stored in a small space, but which can be expanded and used with the necessary accessories to transport thirty or forty gallons of water.

Another object of this invention is to provide a way of filling the bag with a common garden hose from any water pressure system, a way of closing the bag, and means of emptying the bag by gravity through the same hose.

Another object of this invention is to locate an attachment on the plastic bag so that stresses on the attachment will have the least tendency to stretch and tear the bag.

Another object of this invention is to provide a flat plastic bag with a single filling and emptying vent, located and arranged so that gravity suction from the hose will tend to collapse the bag near the vent and shut off the flow of water.

Another object of this invention is to provide a simple means of holding the bag in place while being used to transport water on a motor vehicle.

In the accompanying drawings, FIGURE 1 is a view of the plastic bag, filled with water, laying in a luggage rack on top of a motor vehicle. It is being emptied by gravity through a garden hose into a camping trailer water tank.

FIGURE 2 shows the flat plastic bag and the first step in folding the bag.

FIGURE 2a shows the side view of FIGURE 2.

FIGURE 3 shows the second step in folding the bag.

FIGURE 3a shows the side view of FIGURE 3.

FIGURE 4 shows the completely folded bag, which can either be tied in the folded position or be placed in a small plastic or paper bag for storage.

FIGURE 4a shows the side view of FIGURE 4.

FIGURE 5 is a cross section A—A of FIGURE 6 and shows a means of holding the filled bag on top of a motor vehicle, without use of a luggage rack.

FIGURE 6 is a side view of a motor vehicle, without luggage rack, showing a means of holding the filled bag in place.

FIGURE 7 shows one corner of the plastic bag with the corner pushed in and flattened to provide a strong means of attaching fittings.

FIGURE 8 shows a plastic fitting in one corner of the bag for friction holding of a garden hose.

FIGURE 9 shows the corner of the bag folded back to shut off flow of water from the filling vent.

FIGURE 10 shows a filling tube with pinchcock and female fitting for attachment of a garden hose. This is an alternate filling and closing method to that shown in FIGURES 8 and 9.

FIGURE 11 shows a very simple way of attaching a hose to the plastic bag.

There are numerous occasions when it is necessary to haul water to a camp site or boat from a pressure water system. Usually these systems have a faucet for attachment of a garden hose, which can be used to fill the plastic bag described herein. Heretofore, it has been necessary to carry the water in pails or cans. This has required the laborious work of carrying and lifting several hundred pounds of water to fill one storage tank. By using the method described herein, no manual labor is required to fill the plastic bag, transport water the required distance and empty it into the storage tank. Since the plastic bag rests on top of the vehicle and the heavy weight of water is distributed evenly over the surface and not lifted with tension on the side walls of the bag, the side walls of the bag need to be only strong enough to withstand a few inches of water pressure and thus retain the water on the top surface. This feature distinguishes my invention over the prior art, wherein water has been transported in rigid tanks and in plastic buckets, all of which required strong heavy sidewalls and strong rigid attachments to support the weight of the fluid.

FIGURE 1 shows the plastic bag 10 resting in a luggage rack 11 on the top of a motor vehicle 12. The plastic bag may be made of polyethylene or vinyl sheeting about 0.006 inch thick. Such a bag three by five feet will easily transport 30 gallons of water. Attached to the plastic bag 10 is a hose attachment 13 and a hose 14 which connects into the filling spout 15 in the end of a camping trailer 16.

FIGURE 2 shows the empty bag 10, which may be made of two pieces of sheet polyethylene heat sealed together all around near the outer edges. The bag may have reinforced perforations 17 for tying the bag in place when filled. The empty bag 10 is first folded as shown at 18. The filling and emptying vent is shown at 19, but this should preferably be located at one corner for reasons given below.

FIGURE 3 shows the partly folded bag 10a, first folded as described above. The beginning of the second fold 20 is shown.

FIGURE 4 shows the completely folded bag 10b and cross section showing folds 21. Thus, by making succeeding folds in opposite directions, stress on sidewalls of the bag is reduced.

FIGURE 5 is a cross section A—A of FIGURE 6. The filled bag 10 is shown on top of a motor vehicle 12a, not having a luggage rack. In this case the tie-down straps 22 extending around the bag with extensions 8a and 8b running down to window posts or door handles (not shown) which are used to hold the filled plastic bag 10 on top of the motor vehicle 12a.

FIGURE 6 shows a side view of the motor vehicle 12a, not having a luggage rack, and filled plastic bag 10 on top. Tie down straps 22a and 22b and depressions 23 caused by tension of the tie down straps over the plastic bag 10 are shown. When the extensions 8a and 8b of straps 22 are pulled in opposite directions, the bag 10 is gripped tightly with formation of the depressions 23, due to straps 22a and 22b tending to approach each other.

The preferred method of hose attachment to the plastic bag 10 is shown in FIGURES 7, 8 and 9, or 11.

FIGURE 7 shows isometrically one corner of the plastic bag pushed in transversely and heat sealed to make a flat reinforced surface 24. Radial lines 25 show that tension against the side walls 9 of the bag 10a is equal in all directions within a 90° arc, when tension is exerted by a fitting attached to the flat surface 24. The hole 38 is used in connection with attachment of fittings to the bag.

FIGURE 8 shows preferred elastic fitting 26, that may be made of polyethylene and into which the male threaded end of a gardenhose may be inserted. The fitting 26 is attached to the surface 24 by means of a grommet 27 crimped over a rubber or polyethylene gasket 28. The fitting 26 may be made of the same material as the bag. It may be heat sealed to the bag. The fitting, however, should be designed to grip the hose tightly enough to hold it in place, but at the same time allow disconnection by a pull on the hose. The interior of the fittings may have internal threads to register with threads on the hose fitting in order to hold the hose more securely. When the hose is removed, the fitting 26 is closed by the polyethylene cap 29 that is retained by the polyethylene strap 30, which in turn is attached by the grommet 27 to the polyethylene bag 10.

FIGURE 9 shows the fitting 26 turned 90° toward the viewer on fold line 37 so that the grommet 27 contacts the back side wall of the bag 10, thus closing the opening is in the grommet to prevent out flow of the water until cap 29 can be inserted in the fitting 26.

FIGURE 10 shows an alternate method of providing a hose attachment 13. A plastic flanged ferrule 31 is attached to the flat surface 24 by means of a gasket 28 and push nut 32. A wide interior flange 36 of the ferrule 31 or gasket 28 holds the plastic bag open to prevent collapse and stoppage of water flow during discharge of water through a hose. A common laboratory pinchcock 33 is provided to open and close a resilient tube 34. A female threaded fitting 35 is located in the end of the tube for attachment of the male end of the garden hose 14.

FIGURE 11 shows perhaps the most simple way of making a hose connection and bag closure. In this design polyethylene washers 28 of suitable thickness are heat-sealed to both sides of the flat surface 24 of the polyethylene bag and a polyethylene flap closure 39 is heat-sealed to the inner side. The opening 38 is now of such size to fit the male end of a garden hose and hold it by friction fit while the bag is being filled. The flap 39 is opened and closed by insertion and removal of the male end of the hose 14.

Use of the plastic bag water carrier is as follows:

The flat empty bag 10 is placed on a motor vehicle top of any shape, either with or without luggage rack. On a motor vehicle without luggage rack, straps 22 as shown in FIGURES 5 and 6 are placed around the bag 10 as illustrated. If the vehicle has a luggage rack, the bag 10 is simply placed in the rack and straps 22 are not used as described. The hose 14 is then attached to the fitting 26 or 35 or hole 38. The flat bag is filled with water through the hose by pressure from the water system. As the bag fills it expands until the sidewalls are five inches, more or less, apart. A three by five foot bag will then hold about 30 gallons of water. Water from the hose is then turned off at the faucet. If fitting 35 is used on the bag, the pinchcock 33 is closed and the hose removed, for transport of the water. If fitting 26 is used, the hose 14 and fitting 26 are turned 90° as in FIGURE 9 to prevent out flow of water from the bag when the hose is removed. The hose is then removed and cap 29 inserted in fitting 26. In preparing the filled water bag for transport, the tie down straps 22 are then tied to some convenient place on the motor vehicle, or if a luggage rack is used, one or two of the straps are simply tied across the top of the bag to the rack in any convenient manner. The filled bag is not moved, nor is the water lifted manually during transport. When the water has been transported to the desired location, the male end of hose 14 is again attached to the bag 10 by fittings 26, 35 or hole 38 and the water allowed to flow by gravity into the storage tank. As the bag 10 empties, it returns to a flat shape. It is then folded as described above and stored until again needed for transport of water.

While I have described specific embodiments in detail, the invention is obviously susceptible to variation and may be used to transport other liquids than water. I do not, therefore, desire to be limited except by the scope of the appended claims.

I claim:

1. A collapsible and foldable flat envelope shaped plastic bag for transporting liquid in combination with the top surface of a vehicle, said bag having a single hose connection with valve and thin walls for folding into a small space retaining said liquid on said top surface of the vehicle, said bag at one corner is flattened transversely and reinforced to evenly distribute stress on walls of the bag over an arc of 90° radiating from said hose connection and semirigid fitting with wide interior channel to prevent collapse of said bag when discharging fluid, a hole in said fitting to receive the male end of a garden hose, and interior flap closure for said hole.

2. The combination of a vehicle with an envelope shaped plastic water bag having a wall thickness of about 0.006 inch, said bag flexible so as to assume the shape of its support when carried on the vehicle roof, tie down straps encircling said bag with extensions of said straps extending over the sides of and secured to the vehicle, an opening in the bag for attachment of a hose for the inflow and outflow of water, the thickness of said bag permitting it to be folded in a very small compact unit when empty.

References Cited by the Examiner

UNITED STATES PATENTS

| | | |
|---|---|---|
| 1,798,872 | 3/1931 | Ellis. |
| 1,894,482 | 1/1933 | Dorsey. |
| 2,090,986 | 8/1937 | Rush. |
| 2,105,989 | 1/1938 | Rush. |
| 2,116,434 | 5/1938 | Hollister _____ 180—1 |
| 2,289,032 | 7/1942 | Moffitt _____ 150—2.1 |
| 2,481,135 | 9/1949 | Maness et al. |
| 2,483,561 | 10/1949 | Rauh _____ 261—122 |
| 2,684,796 | 7/1954 | Swenson. |
| 2,687,158 | 8/1954 | Owen _____ 150—1 |
| 2,838,768 | 6/1958 | Fischett _____ 150—21 |
| 2,975,797 | 3/1961 | Matheney _____ 280—5 X |
| 2,991,121 | 7/1961 | Barenyi _____ 296—137 |
| 3,095,206 | 6/1963 | Fresia _____ 280—5 |

FOREIGN PATENTS

| | | |
|---|---|---|
| 766,722 | 4/1934 | France. |
| 122,032 | 1/1919 | Great Britain. |

OTHER REFERENCES

Washington Post, August 5, 1959, page B7.

GERALD M. FORLENZA, *Primary Examiner.*

HUGO O. SCHULZ, *Examiner.*

A. GRANT, J. OLDS, *Assistant Examiners.*